Dec. 19, 1972   A. J. DEROSSET ET AL   3,706,812
FLUID-SOLID CONTACTING APPARATUS
Filed Dec. 7, 1970   4 Sheets-Sheet 2

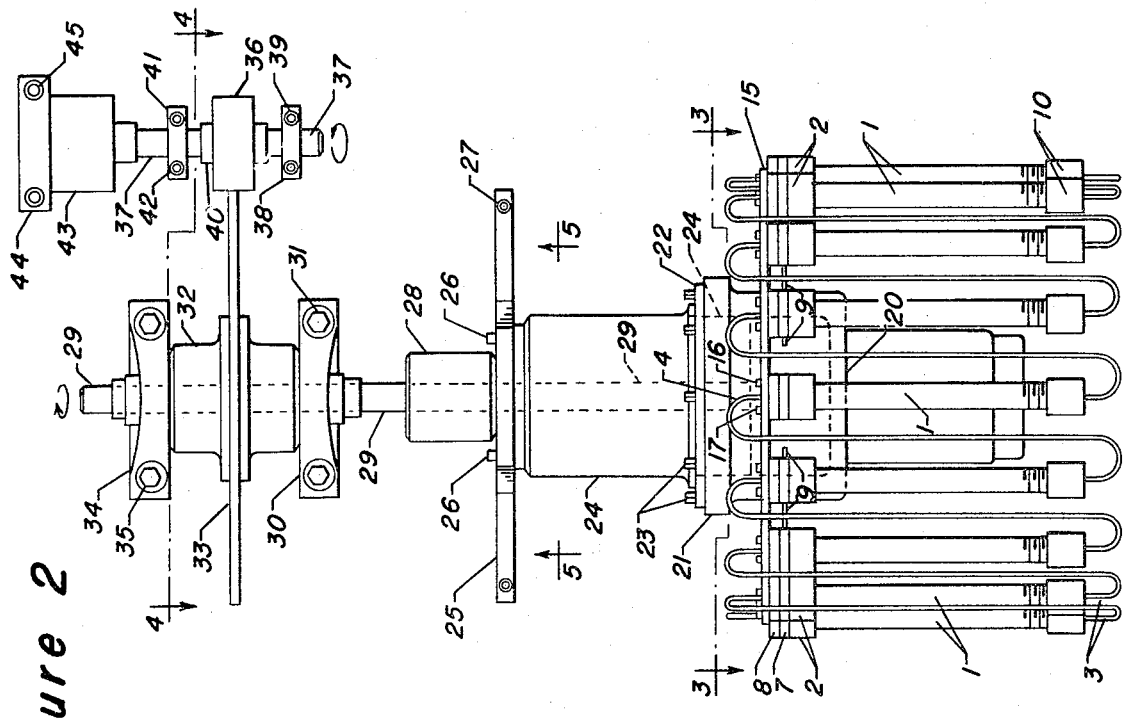
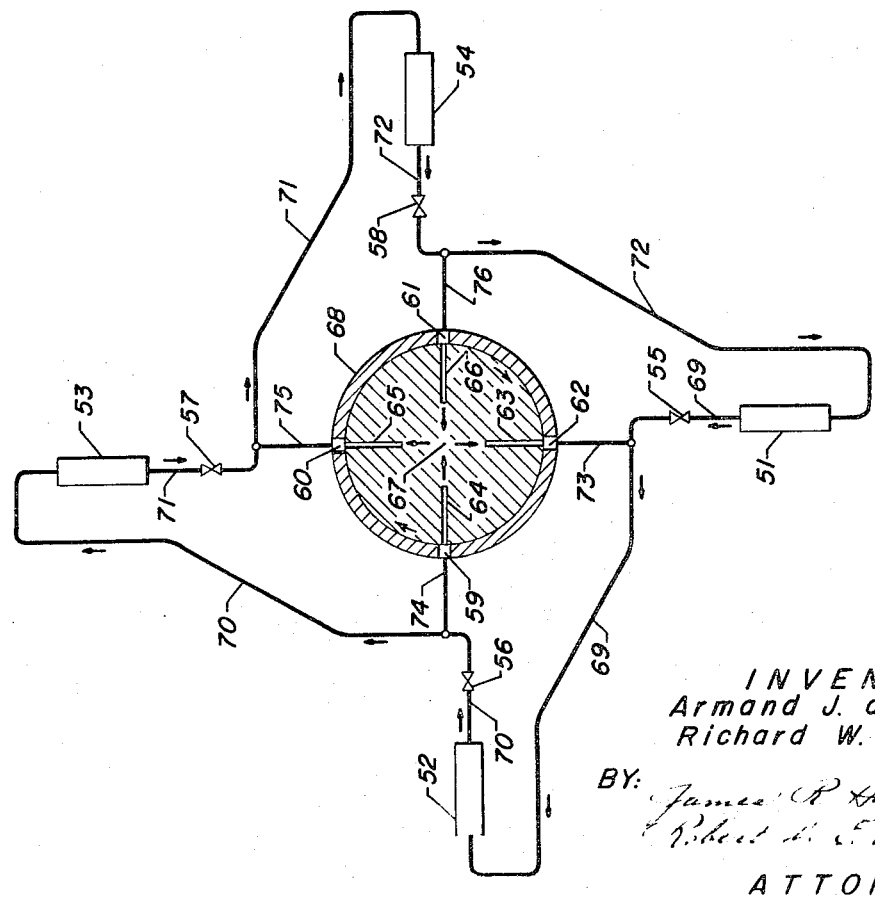

INVENTORS:
Armand J. deRosset
Richard W. Neuzil
BY:
James P. Hoatson, Jr.
Robert W. Erickson
ATTORNEYS

United States Patent Office 3,706,812
Patented Dec. 19, 1972

3,706,812
FLUID-SOLID CONTACTING APPARATUS
Armand J. de Rosset, Clarendon Hills, and Richard W. Neuzil, Downers Grove, Ill., assignors to Universal Oil Products Company, Des Plaines, Ill.
Filed Dec. 7, 1970, Ser. No. 95,673
Int. Cl. C07c 7/12
U.S. Cl. 260—674 SA          11 Claims

ABSTRACT OF THE DISCLOSURE

A fluid-solid contacting apparatus comprising a plurality of adsorbent chambers which are serially connected in a continuous closed loop system. The adsorbent chambers are interconnected by flow conduits which also contain fluid transfer taps and through which the flow of a fluid material may be passed to simulate a countercurrent continuous type flow process. The apparatus contains unidirectional flow directing means which are located between each adsorbent chamber and which allow a unidirectional flow of fluid when there is flow between the adsorbent chambers.

BACKGROUND OF THE INVENTION

Field of the invention

The field of art to which this invention pertains is the fluid-solid contacting apparatus classifications. More specifically, this invention relates to an apparatus which can contain an adsorbent material into which fluid materials are passed and withdrawn at conditions to effect the separation of components in a feed material passed into the apparatus.

Description of the prior art

There is presently prior art which discloses the countercurrent contacting of fluids and solids utilizing methods which can be staged and which allow selective adsorption or removal of components from the given fluid stream by a selected solid adsorbent. Specific apparatus and processes which are disclosed for continuous countercurrent fluid-solid contacting include Berg., U.S. Pat. 2,519,873 (Cl. 183—4.2), Gilmore, U.S. Pat. 2,719,206 (Cl. 210—42.5), and Findley, U.S. Pat. 2,731,149 (Cl. 210—42.5), in which an apparatus or process is disclosed wherein a selected solid adsorbent is moved throughout various zones which allows a basic adsorption and desorption operation to take place. There can be rectification and/or stripping sections located between the individual adsorption and desorption zones in order to allow a selective adsorption and purification of a selected material from a feed stream and recovery of the selectively adsorbed material in a relatively purified state. The apparatus and processes disclosed in these patents are limited to the moving bed systems and in that respect are easily distinguished from the present invention.

The second and more closely related area of countercurrent fluid-solid contacting processes and apparatus concerns an adsorbent material which is stationary with individual adsorption, desorption, rectification and/or stripping zones which are shifted through a series of stationary beds of adsorbent in a manner in which, with respect to the solid adsorbent particles located within any one of the beds, there is a countercurrent flow of solids with respect to the fluid material simulating the essential operations taking place in the aforesaid patents for the moving bed countercurrent fluid-solid contacting apparatus.

Specifically the countercurrent fixed bed fluid-solid contacting processes are depicted in Broughton, U.S. Pat. 2,985,589 (Cl. 210—34) which discloses an apparatus which can be used to allow countercurrent contacting of fluids and solids. A separation is effected by utilizing a fixed bed column having individual beds located within the column with inlet and outlet streams located between the beds within the column. A flow directing device external to the column which advances individual input and output streams to the column, in a cyclic manner to effect an operation being performed within the column which from a position within the column represents a true countercurrent contacting flow. In the fixed bed countercurrent systems flow is effected by connecting the terminal bed portions of a contacting column with a pump around circuit which comprises a conduit connecting the beds and a displacement means within the connecting conduit to induce flow of fluid through the conduit in a given direction.

In large commercial units or a relatively large pilot plant units in which a pump around system is utilized a pump is used to induce positive unidirectional flow of fluid through the pump around conduit thereby introducing the overall net flow in the adsorbent column containing the fixed beds of adsorbent. Mixing which takes place in the pump around circuit because of the turbulence created by the pump does not seriously effect the steady state concentration profile which develops in the fluid flowing throughout the adsorbent column because of the relatively low ratio of the volume of the pump around system as compared to the volume of the entire system. Typically, in commercial units the ratio of the inventory of the pump around system and connecting piping as compared to the total volume of the entire unit in which fluid-solid contacting operations occur is generally much less than 1%. In pilot plants in which a reasonably good separation is effected the ratio of the volume of the pump around circuit and connecting piping as compared to the entire plant volume which is utilized for the separation is generally less than about 3% and typically around 2½%. In instances in which a relatively small fixed bed countercurrent fluid-solid contacting apparatus is utilized for separation of selected components from a fluid stream, the ratio of the volume of the pump around circuit and connecting piping with respect to the volume of the total contacting device greatly increases. This increase presents problems when any sort of pump is used in the pump around circuit in that turbulence caused by requirement that the fluid be pumped through the pump around circuit causes mixing within the circuit and greatly reduces the sharp profiles which are seen as the concentration of the various components in the liquid passing through the contacting device is cyclically advanced in a progressive manner to effect a separation. In addition to the mixing effects which greatly reduced the separation profile in the fluid material within the contacting device the smaller capacity contacting devices (generally less than 20 gallons total capacity) require substantially smaller diameter piping in order to reduce the volume taken by connecting conduits and external piping.

The pumping devices, typically gear pumps, centrifugal pumps or piston pumps which can be installed in piping having diameters of less than a ¼" and typically down well below ⅛" diameter without introducing an increased volume required by the pump itself or adverse pressure drops because of small piping used in the flow for this piping are limited.

We have found that for the small adsorptive units hereinafter described that the problems associated with the reduced capacity of these units can be overcome by (1) completely eliminating the need for a pump around circuit by employing suitable external pressure heads on input and output streams in order to induce a flow of material into and out of the adsorptive unit in a predetermined manner, (2) employing unidirectional flow directing means typically check valves of sorts between serially connected adsorbent chambers to allow flow in a given direction only, and (3) locating transfer taps between individual adsorbent chambers to allow input and output streams to in a programmed manner pass into and out of the contacting apparatus thereby introducing an overall unidirectional net flow of liquid through the serially closed loop connected absorbent chambers which effects a countercurrent flow pattern with respect to solid adsorbent material present within any and all adsorbent chambers while eliminating the problems associated with the moving systems such as preventing attrition of the adsorbent material by its continuous transfer throughout a given system. The prior art relating to countercurrent fluid-solid contacting apparatus and especially those apparatus which are suitable for large scale use generally do not encounter the same difficulty of the mixing of the material passing through the pump around circuit because of the low ratio of the volume of the pump-around circuit as compared to the entire apparatus.

When using the claimed apparatus for small scale separations where feed throughput rates are less than about 50 gallons per day the elimination of the pump-around circuit greatly improves the ability to separate at high efficiencies and purities because of the absence of the aforementioned turbulence induced in the concentration profiles of the material passing through the pump-around circuit.

The claimed invention also allows operation of large commercial facilities where the feed throughputs are much greater than observed in the small scale units. The benefit offered by the claimed invention for large separation units would reside in the elimination of a pump-around circuit which can reduce costs, eliminate the need for a pump and cause a process to be operated using serially connected chambers rather than a large column as is used when pump-around circuits are utilized.

The adsorbent chambers referred to in the specification and claims can include separate chambers as illustrated in the accompanying drawings or can include segregated portions of one or more horizontal or vertical columns of adsorbent.

Connecting conduits as used in the specification and claims includes the passageway connecting separate chambers and depending on whether the chambers are separate and distinct or are part of a continuous column of adsorbent the connecting conduits may vary greatly in length from a few inches where the chambers form part of a column or as many as a few feet where the chambers are separate.

Generally the commercial units are those similar in characteristic to the UOP Molex Process which separates normal paraffins from non-normal paraffins. The feed rate passing into one of these processes can be as much as 7,000 barrels per day with the adsorption column containing as much as 400,000 lbs. of a selected adsorbent. The bed dimensions can generally vary in great amounts and are generally about 10 feet in diameter, the column being approximately 100 ft. long, and containing approximately 24 separate adsorbent beds. We have found in instances in which specialty separations are desired such as those required in the pharmaceutical industry for separating sterols, or other industrial capacities such as a separation of rare earth materials that relatively small operational units which employ throughput capacities arranging from less than a gallon up to about 50 gallons per day can most efficiently separate a given material into the desired components by utilizing the apparatus which we have claimed and disclosed herein.

We have demonstrated the effectiveness and utility of our invention by performing extremely high and efficient separations of the $C_8$ aromatic isomers although we contemplate using other selective adsorbents such as charcoal, ion-exchange resins, silica gel or any other material which is solid or semi-solid in character which displays a pronounced adsorptive capacity for a class of components in admixture with another component or class of components to effect a separation.

DESCRIPTION OF THE DRAWINGS

FIGS. 1, 2, 3, 4, 5, 5A, 6, 6A, 7, 8 and 8A show the various portions of the claimed invention and more precisely illustrate the inventive concept presented.

FIG. 1 simply illustrates the basic components required for the apparatus of this invention. FIG. 2 illustrates a vertical view of the adsorbent chamber, rotary valve and rotating mechanism portions of the apparatus. FIG. 3 depicts a horizontal view of the upper portion of a series of adsorbent chambers and part of the rotating valve. FIG. 4 depicts a horizontal sectional view of the rotating mechanism. FIG. 5 depicts a horizontal sectional view of the upper internal portion of the rotary valve. FIG. 5A shows a vertical sectional view of the upper internal portion of the rotary valve. FIG. 6 illustrates a vertical sectional view of one of the adsorbent chambers. FIG. 7 shows a manifold arrangement to direct fluid flow. FIGS. 8 and 8A show how a separation is effected by the claimed apparatus.

FIG. 1

FIG. 1 shows the basic components of the claimed apparatus. Included in the components of FIG. 1 are adsorbent chambers 51, 52, 53 and 54 which are connected in a series flow type arrangement by connecting conduits labeled 69, 70, 71 and 72. Located between the adsorbent chambers and in line with the connecting conduits are unidirectional flow directing means 55, 56, 57 and 58 which allow flow in a single direction and can commonly be referred to as check valves. Connected to the connecting conduits are fluid transfer taps labeled 59, 60, 61 and 62, which transfer taps are connected to the connecting conduits via intermediate lines 73, 74, 75 and 76.

Figure 3:
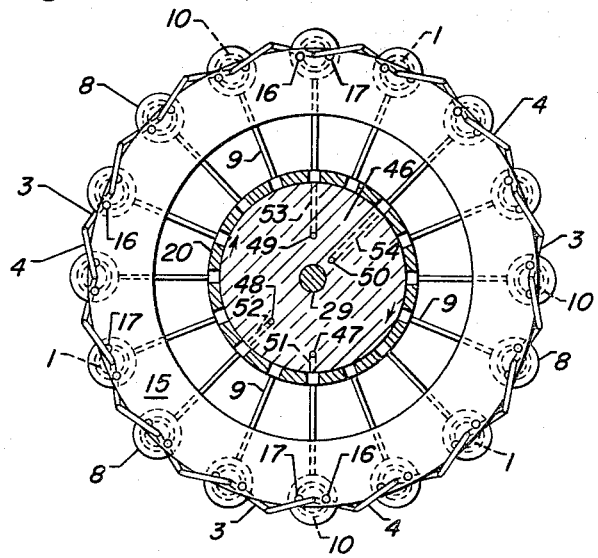

The apparatus shown utilizes a rotating disc rotary valve which allows various input and output streams to be passed through the aforementioned fluid transfer taps into the connecting conduits via the aforementioned intermediate lines in a progressive and cyclic manner. The rotary valve shown rotates in a clockwise direction and does not show various seals and bearings or other detailed portions of the valve which are required for its efficient operation. The rotary valve is depicted by an outer ring 68 in which the fluid transfer taps 59, 60, 61 and 62 are located and an inner portion 67 which contains the external fluid input sources and internal fluid outlet reception sources which are rotated in a clockwise direction to effect continuous cyclic flow through the apparatus. Line 63 located on portion 67 of the rotary valve is an external fluid input source which is typically a conduit connected to a pressure vessel or to a reservoir which can be supplied to this source at a relatively high and controllable pressure. The flow through conduit 63 is into the flow conduit system via transfer tap 62 and intermediate line 73 for the cycle in which the inner portion of the rotary valve is shown. Line 65 is also an external fluid input source and is connected to a relatively high pressure source which allows fluid to pass into the apparatus via fluid transfer tap 60 via intermediate line 75 and into connecting conduit 71 for the cycle in which the rotary valve is indicated. Lines 64 and 66 are internal fluid outlet conduits which are connected to an outlet reception source. These two conduits allow fluid material to flow out of the apparatus from connecting conduit 70 via intermediate line 74 into fluid transfer tap 59 and through outlet conduit 64 into an outlet reception source. Line 66 allows fluid to flow out of the apparatus via conduit 72 into intermediate line 76 through fluid transfer tap 61 and into conduit 66 which directs the fluid to an external reception source.

The rotary valve indicated is a specific embodiment of the apparatus which can be used to introduce flow into and out of the apparatus to establish a simulated countercurrent fluid-solid flow. The appended claims are not necessarily limited to this basic construction as shown or to the rotary type valve for a flow directing device.

It is possible to use a manifold system or a multitude of valves arranged in a manner which allows the alternate flow of materials through transfer taps 59, 60, 61 and 62 in a cyclic manner to allow flow in and out of the apparatus to establish a simulated countercurrent fluid-solid flow.

When using the rotating disc valve the valve is operated so that during a portion of the cylic operations material flows into the apparatus via lines 63 and 65 while materials flow out of the apparatus via lines 64 and 66. Subsequent cycles in the cyclic operations would entail the rotating of the inner portion 67 of the disc valve 90° in a clockwise direction which then allows the material passing through line 63 to pass into fluid transfer tap 59 while the fluid flow through line 65 now flows through fluid transfer tap 61. In a similar manner the outlet streams 64 and 66 are also shifted 90° to a clockwise direction. Continuous cycling can be effected by the cyclic operation of the inner portion of the rotary disc valve which can allow continuous countercurrent operations to take place. When there are more than four adsorbent chambers in the apparatus the valve is shifted to allow the input and output streams to advance one transfer tap per shift.

FIG. 2

FIG. 2 shows an overall view in a vertical manner of a specific embodiment of the apparatus disclosed. FIG. 2 shows adsorbent chambers along with connecting conduits, a rotary valve and a rotating mechanism through which the lower internal portion of the rotary valve can be shifted in a programmed manner to effect a constant cyclic flow through the adsorbent chambers.

The essential pieces of equipment shown in FIG. 2 are rotating wheels 33 and 36, the rotary valve which is located within pieces 20, 21, 22 and 24, support ring 15, the plurality of adsorbent chambers 1 and respective connecting conduits 3 and 4 along with intermediate lines 9.

The rotating apparatus is shown by motor 43 which is permanently affixed to a rigid structure by bracket 44 and connecting bolts 45. Rotating shaft 37 passes through support bearings 38 and 41 which are affixed to a rigid surface by connecting bolts 39 and 42. Rotating shaft 37 passes through rotating wheel 36 and is connected to wheel 36 by bushing 40. The motor 43 rotates wheel 36 which is in contact with rotating wheel 33 which also rotates. Wheel 33 is directly connected to rotating shaft 29 which extends through bearings 30 and 34 through bushing 28 and into and through the rotary valve. The rotary valve contains essentially two discs which are illustrated in more detail in FIGS. 3 and 5. Rotating shaft 29 passes into the lower portion 20 of the rotary valve and connects with a rotating plate which allows flow of material to be alternately and separately passed through the adsorbent chambers.

The adsorbent chambers are connected to the rotary valve by intermediate conduits 9 and are rigidly attached to the apparatus by support ring 15 and connecting conduits 9. The adsorbent chambers are connected by connecting conduits which are shown as conduits 3 and 4 respectively. Adsorbent chamber 1 is described more specifically in FIG. 6. The upper portion of the rotating valve which is located within section 24 contains fixed concentric grooves which have materials passing through the grooves and which are in direct contact with the lower internal rotating disc which is described in FIG. 3.

FIG. 3

FIG. 3 is a horizontal sectional view of the apparatus shown in FIG. 2. The sectional view cuts the lower portion of the rotary valve at piece 20 which contains the lower internal rotating disc of the rotary valve. Shown in FIG. 3 are the top portions 8 of the adsorbent chambers 1 together with the connecting conduits 3 and 4, intermediate lines 9, connecting ports 47, 48, 49 and 50, support ring 15 and lower internal disc portion 46 of the rotary valve.

Figure 5:
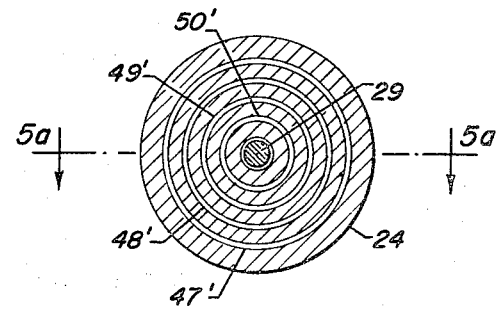
Figure 5A:
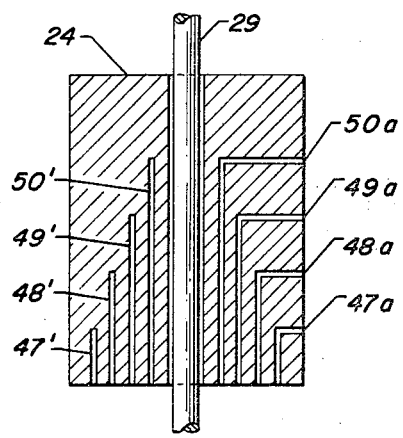

The rotating disc portion of the rotary valve is shown by piece 46 which is rotated within the walls of portion 20 of the valve. As is seen in FIG. 3 the disc rotates in a clockwise direction and is connected directly to rotating shaft 29. The rotating disc portion of the rotary valve makes a preferably fluid tight seal with the groove portion of the valve which is shown in FIGS. 5 and 5A. Various sealing means may be used to prevent leakage of fluids from this valve. The methods of sealing can be found in the teachings of the aforementioned patents relating to a particular type of a rotating disc valve.

The rotating disc 46 contains four ports 47, 48, 49 and 50 which are connected to intermediate lines 9 through the outer wall 20 of the lower portion of the disc valve. The figure indicates there are four ports but there may be more where specific separation requirements need more than four working zones within the adsorbent chambers. The four ports are shown as a simplified illustration of a particular embodiment of the invention. The ports are connected to the intermediate lines 9 by conduits 51, 52, 53, and 54. These conduits pass through the rotating disc towards the center point of the disc until they are an equal distance from the center as the respective ports to which they are connected.

The rotating disc can be made up of any material but is preferably a non-corrosive material susceptible to machining and preferably a cylindrical block which contains horizontal connecting conduits connected with the aforementioned ports which ports preferably extend vertically and parallel to the axis of the cylinder as shown in the drawing.

FIG. 4

Figure 4:
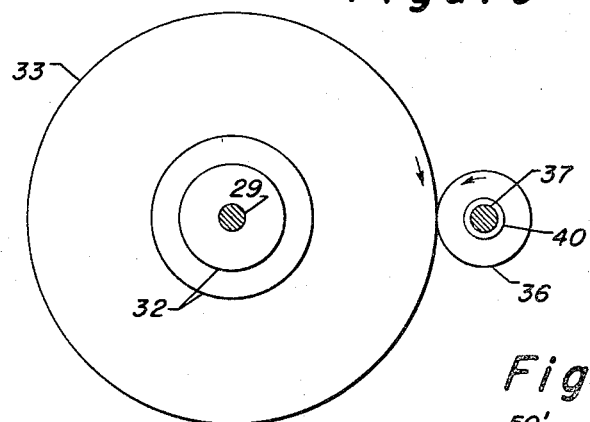

FIG. 4 shows a horizontal view of the two rotating wheels of the apparatus shown in FIG. 2. Rotating wheel 33 rotates in a clockwise direction and is in contact with rotating wheel 36 which rotates in an anti-clockwise direction. Rotating wheel 33 is connected to shaft 29 as shown in FIG. 4. Rotating wheel 36 is directly connected with rotating shaft 37 which is rotated by motor 43. The two rotating wheels can also be gears intimately contacted.

FIG. 5

FIG. 5 shows a detailed drawing of the upper internal portion of the rotary valve which is located within sections 21, 22 and 24 of the valve. FIG. 5 is a horizontal sectional view shown in FIG. 2 looking upwards from the bottom of the internal portion of the valve. The upper internal portion of the rotating valve is stationary and contains concentric grooves 47', 48', 49' and 50' which are connected to the respective ports located on the lower rotating portion of the rotating valve shown in FIG. 3. The upper internal portion has rotating shaft 29 passing through as it is shown. The upper internal portion is preferably a cylinder of a non-corrosive material. It contains grooves which are machined in a concentric manner about the axis of the cylinder. Each groove is connected to a fluid source which is not shown on the figure which allow fluid to pass into and out of the grooves continuously. The grooves and their respective ports are always directly connected which allows each combination port and groove to have a constant fluid supply from which to draw or a constant source to which it can pass fluid.

FIG. 5A

FIG. 5A shows a vertical section of the sectional view shown in FIG. 5. The portion of the rotary valve apparatus depicted in FIG. 5A is the upper internal portion and contains the aforementioned grooves 47', 48', 49' and 50' which are connected to their respective internal outlet reception sources or external input sources 47A, 48A, 49A and 50A as shown. The lower portion of the grooves are connected with the ports 47, 48, 49 and 50 described in FIG. 3. Fluid material passes into or out of the apparatus via the ports, grooves and the input or output sources.

The fluid input and external outlet reception sources are generally connected to vessels which can receive a suitable fluid from the apparatus or pass a fluid into the apparatus described. Preferably the input sources contain pumps in line with the conduits passing from the vessels to the input sources on valve 24. The internal fluid outlet reception sources are vessels which can receive the fluid from the system and which can maintain a certain amount of line pressure in the lines within the apparatus. Preferably the outlet lines contains what the art referes to as back pressure type devices commonly referred to as back-pressure valves which allow a certain line pressure to be present on the lines leading from the flow directing valve to the respective internal fluid outlet reception sources in order that a consistent plant pressure may be maintained. Additionally the back pressure valves maintain sufficient head for the inlet stream pumps to pump against to obtain a desired and efficient control of fluid flow throughout the apparatus.

FIG. 6

Figure 6:
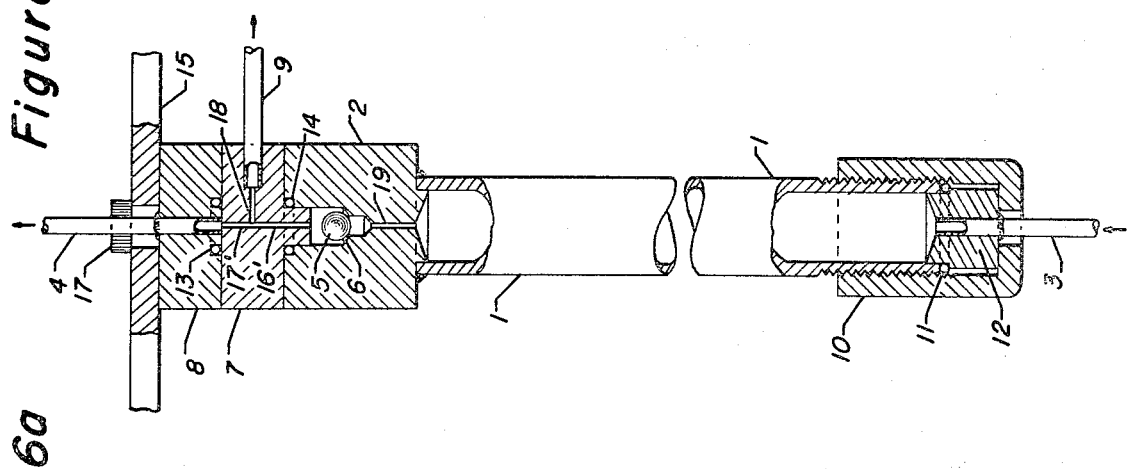

FIG. 6 shows a detailed drawing of one particular method of construction of an adsorbent chamber 1 which is part of the claimed apparatus. The claimed apparatus can contain any number of adsorbent chambers which generally are elongated in nature and contain solid adsorbent which possess the ability to selectively retain and exclude various species of a class of compounds. The apparatus can contain generally from about 4 up to about 50 or higher adsorbent chambers serially connected.

The adsorbent chamber illustrated in FIG. 6 has a unidirectional flow directing means as part of the overall chamber construction. In many instances the unidirectional flow directing means or check valve can be located between the serially connected adsorbent chamber in line with the connected conduits.

The adsorbent chamber 1 is an elongated cylindrical vessel and is sealed at both ends by plugs or caps which can be attached to conduits which allow flow into and out of the chamber at opposite ends. The adsorbent chamber contains at its lower portion a pipe cap which is screwed onto the lower portion of adsorbent chamber 1. Cap 10 holds sealing block 12 to the lower portion of the adsorbent chamber 1. Sealing ring 11 commonly a Teflon O ring contacts the lower portion of adsorbent chamber 1 and block 12. Connecting conduit 3 passes through connecting block 12 and into the lower portion of the adsorbent chamber 1. The connecting conduit 3 is permanently affixed to the sealing block 12 as illustrated and is welded to the plugs at the point where the conduit first contacts the sealing block 12 and is illustrated by the welded configuration as shown. Connecting conduit 4 passes out of the adsorbent chamber at its uppermost portion. Connecting conduit 4 passes through sealing block 8. The connecting conduit 4 is in open communication with conduits 16', 17' and 18 located within sealing block 7. In the path of flow from the adsorbent chamber 1 in an upward direction, the material must pass by the unidirectional flow directing means which is located in sealing block 2 which is directly connected to adsorbent chamber 1. A ball-type check valve is illustrated with the ball 5 sealing conduit 19 at seat 6. Ball 5 and seat 6 are machined in a proper manner so that a relatively smooth and effective seat is established.

Figure 6A:
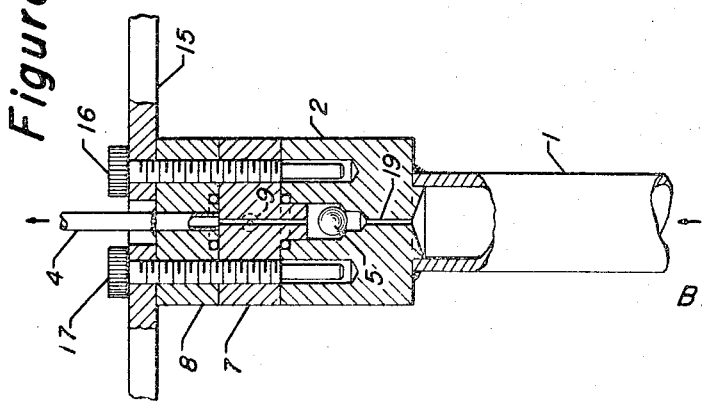

The connecting conduits which are referred to throughout the specification as connecting the individual adsorbent chambers are illustrated by conduits 3 and 4 on FIG. 6. Conduit 9 is in communication with conduit 16' and 17' located within sealing block 7 via conduit 18. The other portion of conduit 9 is connected to a fluid transfer tap which is connected to a flow directing device. Conduit 4 is connected to block 8 in a permanent fashion by welds as illustrated. Plate 15 is a support plate which generally can be circular in nature upon which the series of adsorbent chambers can be distributed. Cap screws 16 and 17 as illustrated on FIG. 6A allow a connection of the entire piece of apparatus to plate 15. Sealing block 2 is permanently connected to adsorbent chamber 1 as illustrated and is welded thereto. Sealing blocks 2 and 8 contain Teflon O rings which are located at portions 13 and 14 as illustrated.

The overall adsorbent chamber apparatus as shown operates as follows: material desired to be withdrawn from the adsorbent chamber can be withdrawn via conduits 9 or 4 depending upon the operation taking place. The check valve located in sealing block 2 as illustrated would normally allow flow only in an upward direction. Flow into adsorbent chamber 1 is limited to that material passing via conduit 3, or in other words, into the lower portion of adsorbent chamber 1. In instances in which flow is desired to be passing into conduit 4 via conduit 9 as illustrated, the flow would be into conduit 9 through conduit 18 in an upward direction through conduit 17' and into conduit 4. The check valve located in sealing block 2 prevents flow in a downward direction.

The unidirectional flow directing means located within sealing block 2 is a ball-type check valve. It may be a spring loaded ball-type check valve, flapper type check valve or any other proper design which allows flow in a single direction while preventing flow from backing up through the check valve. The adsorbent chamber is generally made out of a stainless or other type corrosion resistant material.

A specific illustration of FIG. 6 would include an adsorbent chamber 1 which consists of 12 inch long ½ inch schedule 80 Monel pipe connected to a threaded pipe cap 10 at its lower portion. The sealing block 12 of FIG. 6 can be machined to fit within the pipe cap and offer a relatively leak-proof seal where Teflon O ring 11 contacts both adsorbent chamber 1 and sealing block 12. Conduits 3, 4, and 9 can consist of ⅛ inch 20 gauge Monel tubing. The check ball 5 of FIG. 6 can consist of ¼ inch machined and polished steel ball which is present within sealing block 2. Conduits 16', 17', 18, 19 of FIG. 6 can be machined to the approximate dimensions of the inside diameter of the tubing used for the conduits.

FIG. 6 is a specific illustration of adsorbent chamber and a unidirectional flow directing means which are a unitary piece of apparatus. The figure illustrates a specific embodiment but is not illustrated in order to unduly limit the scope of the claims and is shown for purposes of illustration and to present an enabling disclosure in this respect.

FIG. 7

Figure 7:
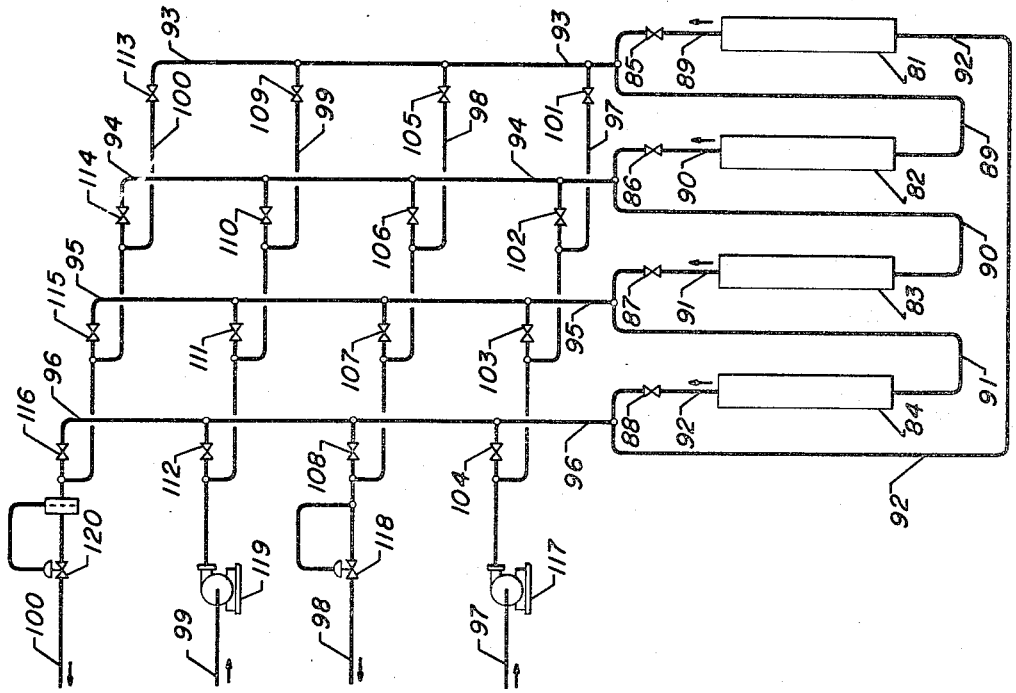

FIG. 7 shows an alternate embodiment of an apparatus disclosed herein where, instead of a rotary type disc valve for a flow directing device, a manifold arrangement is used. Valves 101 through 116 on the input and output streams serve to induce a countercurrent flow of fluid through the adsorbent chambers.

The adsorbent chambers are shown as being serially connected and represented by chambers 81, 82, 83 and 84. As previously mentioned in other descriptions of the apparatus, there may be any number of adsorbent chambers generally greater than four and specifically anywhere from four up to fifty or more. The adsorbent chambers are serially connected in a closed loop configuration by connecting conduits in lines 89, 90, 91 and 92. In line with the connecting conduits are unidirectional flow directing devices 85, 86, 87 and 88 which allow flow as shown on the figure in an upward direction only. Because there is a manifold system used, the fluid transfer taps are stationary and are represented by conduits 93, 94, 95 and 96 and are connected to the respective input and output sources 97, 98, 99 and 100. The external fluid input sources contain in line pumps represented by 117 and 119 respectively. The internal fluid outlet source 98 contains a back pressure valve 118 which maintains a given pressure on the fluid upstream from valve 118. Flow regulating valve 120 on source 100 regulates the amount of materail removed from the process via line 100.

During normal operations the fluid passing into and out of the apparatus are controlled by alternating opening one of the valves 101, 102, 103 or 104 located on line 97, plus one of the valves 105, 106, 107 or 108 located on line 98, plus one of the valves 109, 110, 111, or 112 located on line 99, plus one of the valves 113, 114, 115 or 116 located on line 100 in order that alternate materials will pass into and out of the apparatus. By suitable programming of the aforementioned valves located on the input and output sources the countercurrent flow of fluid can be induced with respect to solid adsorbent which is stationary and located within each of the four aforementioned adsorbent chambers. The unidirectional flow directing devices 85, 86, 87 and 88 allow flow only in a single direction and when fluid is passed into the apparatus via lines 93 and 95 the material cannot pass below the check valve and must flow through the respective conduits 89 and 91 into the upstream adsorbent chambers either 82 and 84. In a likewise manner, the fluid which is withdrawn from the apparatus via lines 94 and 96 must pass out of the apparatus by first going past the respective check valves 86 or 88 and then out of the apparatus.

When the manifold arrangement is used as the flow directing device to induce a countercurrent flow of fluid with respect to stationary adsorbent within the adsorbent chambers, one valve on each of the two input streams and one valve on each of the two output streams is opened at given time periods. After sufficient flow has taken place into and out of the adsorbent chamber the valves are closed. A different set of valves are then opened (one valve per each input and each output stream) and fluid is allowed to pass into and out of the absorbent chambers. The valves on respective input and output sources are opened and closed in a manner which allows a cyclic operation to take place wherein a given input and output stream passes through fluid transfer taps and into the chambers.

In assuming an adsorptive type operation to be taking place, a feed stream containing a component which is selectively adsorbed by a particular adsorbent is loaded within the adsorbent chambers. The selectively adsorbed component of the feed is removed from the adsorbent by passing a desorbent material into the apparatus and desorbing the selectively adsorbed component of the feed. The adsorbed component is recovered in an extract stream while the non-selectively adsorbed component of the feed is withdrawn from the apparatus in a raffinate stream. The separated components are more concentrated with respect to each other. For most operations it is preferred that the desorbent material be easily separated from the feed stock because the desorbent material generally is in admixture with the selectively adsorbed component of the feed which is in the extract stream and the non-selectively retained feeed component which is in the raffinate stream. Specific operations of the manifold flow directing device are as follows for Period I of the cycle of operations in which 4 periods comprise one complete cycle of operations.

During Period I a feed stream passes into the adsorbent chamber 84 via line 91. The feed stream passes into the apparatus via external input source 99 past valve 111 and into transfer tap 95 which is represented as a conduit on the manifold. Transfer tap 95 is connected to connecting conduit 91 through which the feed passes into adsorbent chamber 84. Unidirectional flow directing device 87 prevents flow of feed materials into adsorbent chamber 83 from conduit 91. The selectively retained component of the feed stock is adsorbed by the adsorbent present in chamber 84. For the purpose of illustration the feed stock shall be considered in a liquid phase which allows the non-retained portion of the feed to the present within the interstitial voids around the surface of the solid adsorbent. A portion of the non-selectively retained feed stock may be slightly adsorbed by the adsorbent but this material is eventually flushed off of the adsorbent.

During the same time that the feed stock passes into adsorbent chamber 84 in the aforementioned manner, raffinate material passes out of the adsorbent chamber past unidirectional flow directing device 88 into conduit 92, into transfer tap 96 past valve 116 and into internal fluid outlet reception source 100. The feed stock passing into adsorbent chamber 84 displaces the raffinate material present within that adsorbent chamber from previous period of operations. For purposes of simplification, during this period of operations there shall be considered to be no flow into adsorbent chamber 81 via conduit 92. At the same time that feed and raffinate are passing into and out of chamber 84, a desorbent material passes into adsorbent chamber 82 via conduit 89. The desorbent material comes from external fluid input source 97 which passes desorbent through line 97 past valve 101, into transfer tap 93 and eventually into adsorbent chamber 82 via conduit 89. The desorbent which passes into adsorbent chamber 82 displaces extract material which is present within the adsorbent in that chamber from a previous period of operations. The desorbent displaces or desorbs substantially all of the selected material of the feed stock from the desorbent in chamber 82. The extract material passes out of chamber 82 past unidirectional flow directing device 86 into conduit 90 to transfer tap 94 past valve 106 and into internal fluid reception source 98. Again for purposes of simplification, there shall be considered no net flow of material through conduit 90 into adsorbent chamber 83 for this specific period of operations.

The above described flow pattern is Period I of the entire cycle of operations. The next period of operations (Period II) of the cycle would entail transferring the feed stock from transfer tap 95 to transfer tap 96, with the raffinate stream being transferred from transfer tap 96 back to transfer tap 93, the desorbent stream transferred from transfer tap 93 to transfer tap 94, and the extract stream from transfer tap 94 to transfer tap 95. The shift of the feed, raffinate, desorbent and extract streams is done simultaneously. The same basic operations occur within the individual adsorbent chambers during this period as was previously described during the previous period. The only difference is that in these operations the adsorption and desorption steps take place in different chambers. The next period of operations (Period III) would entail a shift of feed stock from transfer tap 96 to transfer tap 93, a shift of desorbent from transfer tap 94 to transfer tap 95, a shift of the extract stream from transfer tap 95 to transfer tap 96 and a shift of the raffinate stream from transfer tap 93 to transfer tap 94. The shift again would be a simultaneous one and after the individual operations during this period have taken place within the adsorbent chambers, a third shift would occur.

The next period (Period IV) would entail a shift of the feed from transfer tap 93 to transfer tap 94, a shift of the raffinate from transfer tap 94 to transfer tap 95, the shift of extract from transfer tap 96 to transfer tap 93 and the shift of desorbent material from transfer tap 95 to transfer tap 96. This flow period is the last period for the complete cycle. The next shift which takes place will pass the feed, raffinate, desorbent and extract streams to the same position they had during Period I previously described.

The operations described above taking place in the adsorbent chambers are essentially the same where a rotating disc type valve is used. The only difference between the operations taking place when a manifold is utilized as a flow directing device instead of a rotating disc valve type flow directing device is the routing of input and output streams into the transfer taps. For all practical purposes the apparatus including the transfer taps, the connecting conduits, the serially connected chambers and the unidirectional flow directing devices are basically the same whether the manifold or rotating disc valve flow directing device is used.

In the operations described in the description of FIG. 7 the two basic operations taking place were adsorption and desorption and were effected simultaneously. By a shifting of the input and output streams to the various transfer taps as was indicated for the different periods of operation a continuous operation is effected, a continuous recovery of extract and raffinate occurs along with a continuous utilization of desorbent material and feed stock. The shifting of the input and output streams allows a true countercurrent flow type operation to take place. This type operation can readily be improved by utilizing staged type operations in which more than one adsorbent chamber is used for the individual adsorptive and desorptive operations.

The descriptions in FIGS. 1 and 7 show relatively simplified operations with 4 chambers utilized for adsorption and desorption operations. In many instances it is preferable to use more than 4 adsorbent chambers in the apparatus. It is also possible to utilize more than 2 input and 2 output streams to operate the apparatus in an efficient manner.

EXAMPLE I

Example I illustrates the use of the apparatus claimed in a process for separating a $C_8$ aromatic isomer mixture into concentrated portions of para-xylene and the other $C_8$ aromatic isomers.

Figure 8A:
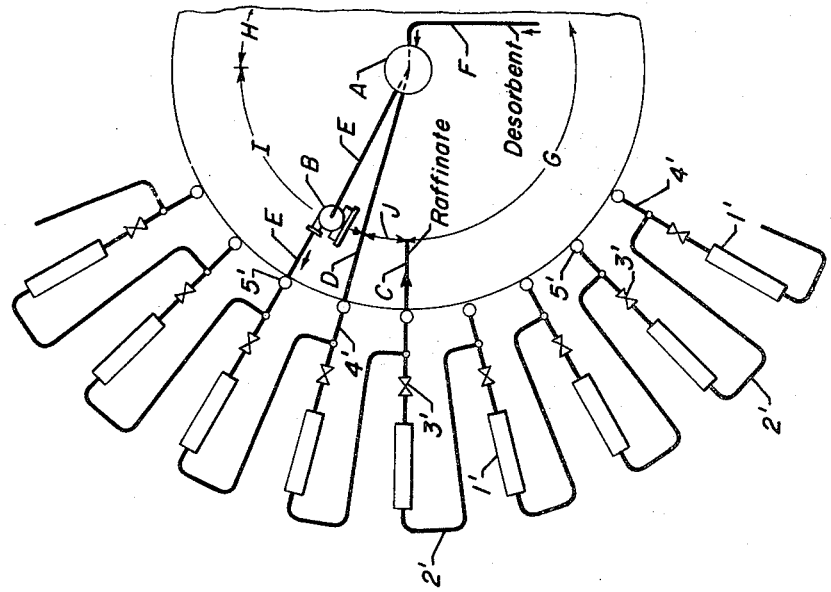
Figure 8:
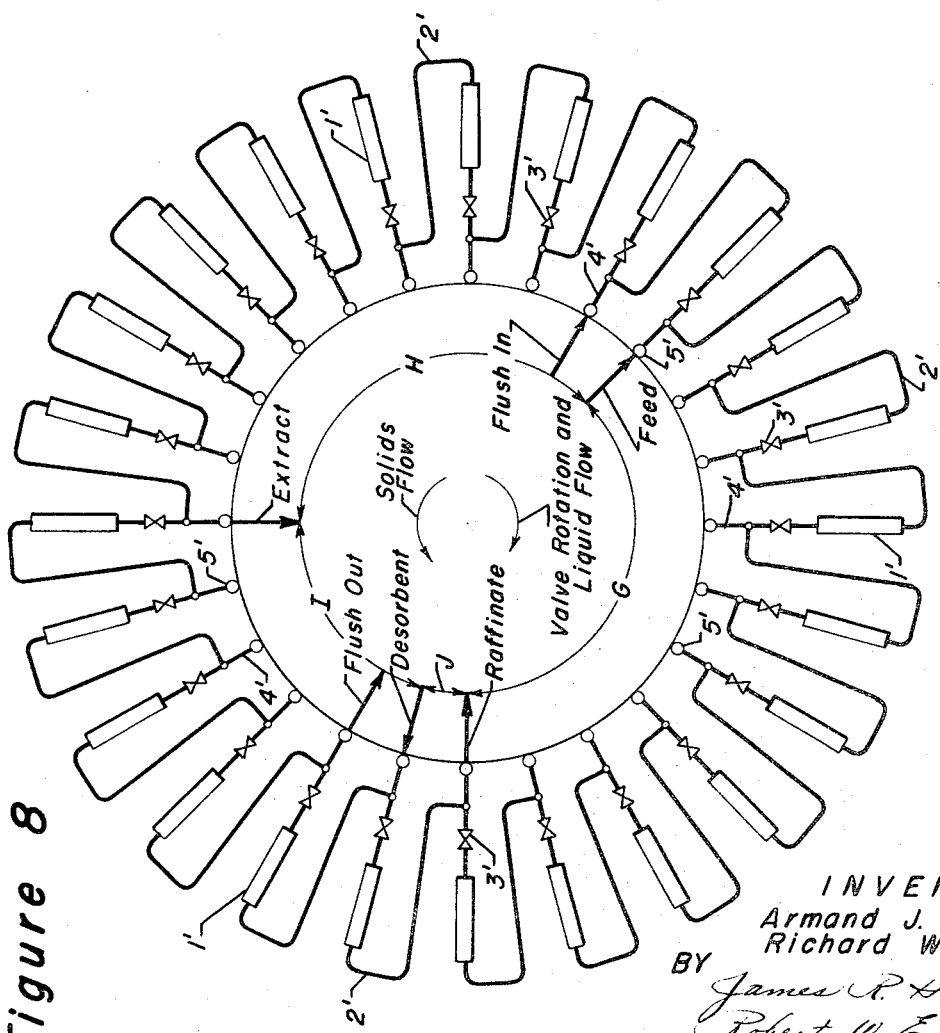

Reference is made to FIG. 8 in order that a complete description of the equipment which is used in this example be given. In this example 24 adsorbent chambers were serially connected in a manner which allowed a net flow of liquid material to take place throughout the chambers. The 24 chambers contained a total adsorbent bed volume of 1056 cc. with each chamber containing approximately 44 cc. of solid adsorbent. The entire apparatus including the adsorbent chambers and a rotary rotating type disc valve flow directing device was maintained at a temperature of 150° C. and a pressure of approximately 100 p.s.i.g. The feed stream contained a $C_8$ aromatic isomer distribution of approximately 32.6 vol. percent ethylbenzene, 14.3 vol. percent para-xylene, 35.5 meta-xylene, and 17.6 vol. percent of ortho-xylene. An adsorbent was used which had a crystalline structure substantially identical to the type X crystalline aluminosilicate which is known in the art. The adsorbent contained a weight ratio of Ba/K of about 11.3. The adsorbent had the capability of selectively adsorbing para-xylene from the feed stream. A desorbent material was used which could displace para-xylene from the adsorbent after the para-xylene had been selectively adsorbed by the adsorbent. The desorbent used for this example was essentially a 100% purity commercially available toluene. The toluene was selected because in addition to displacing adsorbent para-xylene from the adsorbent it was relatively easy to separate from any component of the feed mixture by a simple fractionation step.

FIG. 8 shows the 24 serially connected adsorbent chambers 1' along with the connecting conduits 2' uni-directional flow directing devices 3' and transfer taps 5'. Since the illustration as shown utilizes a rotary type flow directing device, it shall be assumed for purposes of simplification that the input and output streams were maintained in the positions shown on FIG. 8 although the claimed apparatus is not limited to the placement as shown on the figure. The rotary valve was rotated in a clockwise direction through separate 24 shifts, or periods which made up one entire cycle of the operations which was exactly one full rotation of the rotary valve. The valve was rotated through one revolution in a total period of time in approximately 107 minutes, since there were 24 periods per cycle each period was about 4 minutes 27½ seconds long.

The rotary valve as shown in FIG. 8 contained a total of 6 input and output sources. Staring with the extract outlet reception source located at the top of the rotary valve and then in a clockwise direction the next stream on the rotary valve is a flush input stream which passes desorbent material into the process. The next stream going in a clockwise direction is the feed stream which is another input source. The next stream is an outlet reception source which is a raffinite stream which comprises the components of the feed stream which were not selectively adsorbed by the adsorbent and some desorbent material. The next stream is a desorbent input stream through which desorbent material passes into the apparatus The final stream before coming back to the extract outlet source is a flush outlet stream.

The valve was rotated in a clockwise direction moving approximately 15° for each period. After materials had passed into and out of the adsorbent chambers for an extent of time determined for a given period the valve was shifted in a clockwise direction to allow flow through the conduits now in communication with the rotary valve in its new position. By continuously shifting the valve after each period of operations an overall net flow was established through the serially connected adsorbent chambers. The flow through the chambers was in the same direction as the rotary valve rotation which was in a clockwise direction. The unidirectional flow directing devices prevented input streams from flowing in an anti-clockwise direction.

The feed stream, flush input stream and desorbent input streams were all passed into the flow directing device at relatively high pressures which were induced by the use of pumps which took their suction from a vessel containing feed materials or desorbent materials. The extract and flush out material streams were connected to flow control valves to maintain controllable flow out of the process. The raffinate output stream was connected to a back pressure valve which set the process operating pressure. The input stream flow rates were controlled by varying the pressure drop across a valve located on the discharge portion of the pumping device located on the respective input stream.

For purposes of simplification, the operations taking place in the 24 adsorbent chambers can be described by segregating the chambers located between various input and output streams and briefly describing the operations taking place between these streams. Because the flow directing device is continuously shifting, the operations taking place between the input and output streams on the rotary valve are always the same. In this manner, it can be seen that a countercurrent flow type operation takes place with a fixed bed of adsorbent and a constantly flowing fluid medium. The input and output streams were placed in the rotating valve at distances from one another which would allow a certain amount of adsorbent beds to be located between individual input and outpute streams to allow a large adsorbent volume to be present during adsorption and a relatively small bed volume to be utilized during the desorption step.

Starting with the raffinate output source and going in anti-clockwise direction to the feed inlet source, there are nine adsorbent chambers which are considered to be located within Zone G of the apparatus. The beds located in an anti-clockwise direction from the feed input stream to the extract outlet comprise Zone H contains nine adsorbent chambers. Going in an anti-clockwise direction from the extract output source to the desorption input source, there are five adsorbent chambers which comprise Zone I. The sole adsorbent chamber located between the desorbent input and raffinate output sources is designated as Zone J. During the rotation of the valve as shown in FIG. 8 attached, the overall flow of liquid through the 24 adsorbent chambers is in the same direction as the rotation of the rotary valve which is a clockwise direction. Since the solid contained within the individual adsorbent chambers is stationary there is only a physical flow of liquid. The overall process flow resembles a countercurrent flow of solid and fluid material which flow effects the separation of the components of a feed stock by utilizing a specific adsorbent capable selectively separating one such feed component from the feed mixture. The individual zones are shifted in a clockwise direction when the individual input and output streams which pass into the apparatus are shifted. Since there is a shifting of the zones, there is adsorbent entering and leaving the zones when they are shifted during the cycle. In order to induce a fluid flow in the process, the input and output streams are carefully controlled. An overall view of the flow would indicate solid adsorbent flowing in an anti-clockwise direction with a simultaneous flow of fluid material in a clockwise direction.

Zone G is an adsorption zone. In this zone, the selective material from a feed stock (for purposes of this example, para-xylene) is selectively adsorbed from a feedstock. The solid adsorbent passing into Zone G via the Zone G and Zone J boundary (the raffinate stream) contains only desorbent material which is present within the process. As a solid passes in an anti-clockwise direction through Zone G it picks up para-xylene from a liquid feed stream which passes into Zone G at the boundary between Zone G and Zone H (the feed stream) and loses the less selectively retained feed components. Some of the desorbent material is simultaneously desorbed from the solid adsorbent by para-xylene which becomes adsorbed upon the adsorbent. The liquid passing out of Zone G at the Zone G and Zone J boundary is essentially a raffinate material comprising desorbent and the non-selectively retained components of the feed mixture. The solid adsobent by virtue of its anti-clockwise flow pattern together with entrained liquid then passes into Zone H from the Zone G and Zone H boundary (the feed stream).

Zone H is essentially a rectification zone which removes certain adsorbed feed components (ortho-xylene, meta-xylene and ethylbenzene) from the solid adsorbent passing into Zone H which has just been in contact with the feed stock.

The liquid entering Zone H from the boundary between Zone H and Zone I contains only para-xylene and desorbent because at that boundary position the extract removal stream is located. As the liquid material passes through Zone H towards Zone G any adsorbed raffinate feed components are gradually desorbed from the solid material passing through Zone H towards Zone I by a liquid consisting of para-xylene and desorbent materials. Because para-xylenes are more tenaciously held than the raffinate feed components, it is possible to completely accomplish removal of the raffinate components from the solid without simultaneously removing all of adsorbed para-xylene from the adsorbent which is in Zone H.

The flush stream passing into Zone H is used to wash some of the feed material which has been entrained in the connecting conduits and lines which have previously contained feed. The flushed feed components pass into Zone G and are thereby prevented from contaminating the extract material when it is recovered in a later desorbent operation.

Zone J is used to prevent the contamination of the adsorbed para-xylene completely from the solid adsorbent. The solid entering Zone I from the Zone H and Zone I boundary (the extract stream) carries para-xylene and desorbent material as adsorbed components. Liquid entering Zone I from the Zone I and Zone J boundary (the desorbent stream) contains only desorbent material. As the solid material moves through Zone I towards Zone J the para-xylene is gradually desorbed by the desorbent material which passes countercurrent to the solid adsorbent. The liquid leaving Zone I at the Zone H, and Zone I boundary is an extract material and contains substantially only desorbent and para-xylene. The liquid entering Zone I via Zone I and Zone J boundary is a desorbent material which is essentially 100% toluene.

Zone I contains a flush out stream. The flush out stream was utilized to remove extract material from the intermediate lines and connecting conduits in Zone I before they reached Zone J. The material removed by this stream was essentially a para-xylene and desorbent mixture and was removed so that the desorbent which passed to the process in a subsequent valve setting was not contaminated with para-xylene.

Zone J is used to prevent the contamination of the extract material withdrawn from Zone I by supplying at least one bed of adsorbent to act as a barrier between the raffinate stream outlet and the desorbent stream inlet.

An alternate use of the flush out stream shown in FIG. 8 is shown in FIG. 8A. The rotary valve is arranged in a similar manner as shown in FIG. 8 except that a pump B and a three-way valve A are incorporated into the overall valve design. Raffinate line C carries raffinate material out of the apparatus. Line D (the desorbent line of FIG. 8) is used in conjunction with three-way valve A and pump B to carry desorbent material out of the adsorbent chamber connected to line D and into the chamber connected to line E. The liquid removed from the chamber connected to line D is replaced with raffinate material which does not pass out of the apparatus via raffinate line C. Pump B and three-way valve A are controlled to allow removal of desorbent material from Zone J via line D while passing desorbent into the apparatus via line F. This type of operation also helps conserve overall desorbent use.

In a manner similar to that described for FIG. 8A, the extract stream can be pumped for an initial period of time into Zone H from Zone I. Since the first extract stream material withdrawn from Zone I contains essentially all extract material, this material can be used to reduce the quantity of desorbent material that would otherwise pass into Zone H thereby conserving desorbent usage and reducing the amount of desorbent surrounding the adsorbent in Zone H which in some instances degrades the adsorbent's performance.

With experiments conducted utilizing the apparatus and operating conditions described, a feed stream was passed into the apparatus wherein it was separated into an extract stream which contained a concentration of para-xylene and a raffinate stream which contained a concentration of the ethyl-benzene, ortho-xylene and meta-xylene. The separations were effected using a toluene desorbent with Zones G, H, I and J containing various numbers of adsorbent chambers. Table I indicates the physical arrangement of the input and output sources with respect to the various zones and shows the amount of adsorbent beds used for each zone with specific boundaries indicating the various zones. Additionally shown in Table I are the flow rates which were utilized. The input and output flow rates are actually those measured at operating conditions of 150° C. and approximately 100 lbs. p.s.i.g.

TABLE I.—XYLENE SEPARATION EXPERIMENT
(Refer to Figure 8 for flow description)

| Zone | Location | No. of ads about chambers |
|---|---|---|
| 1 | Between raffinate fluid outlet and feed fluid input | 9 |
| 2 | Between feed fluid inlet and extract fluid output | 9 |
| 3 | Between extract fluid outlet and desorbent fluid input | 5 |
| 4 | Between desorbent fluid inlet and raffinate fluid outlet | 1 |

Flow Rates

| | | |
|---|---|---|
| Feed input | 46.6 | Ml./hr. at 150° C. and 100 p.s.i.g. |
| Flush input | 21.1 | Do. |
| Desorbent input | 578.0 | Do. |
| Total | 645.7 | Do. |
| Extract output | 53.3 | Do. |
| Flush output | 11.1 | Do. |
| Raffinate output | 582.0 | Do. |
| Total | 646.4 | Do. |

Table II below shows the various compositions found after steady state operations had been effected for the extract, raffinate, feed and desorbent streams. It is noticed that the extract stream contains an extremely high percentage of a $C_8$ aromatic hydrocarbon para-xylene. This indicated an extremely good separation with high efficiencies taking place.

TABLE II

Stream compositions

| | Vol. percent |
|---|---|
| Extract: | |
| $C_8$ isomers | 11.2 |
| Toluene | 88.8 |
| $C_8$ distribution: | |
| Ethylbenzene | 0.5 |
| Para-xylene | 98.6 |
| Meta-xylene | 0.5 |
| Ortho-xylene | 0.4 |
| Raffinate: | |
| $C_8$ isomers | 7.4 |
| Toluene | 92.6 |
| $C_8$ distribution: | |
| Ethylbenzene | 37.5 |
| Para-xylene | 0.9 |
| Meta-xylene | 38.8 |
| Ortho-xylene | 22.8 |
| Feed: | |
| Ethylbenzene | 32.6 |
| Para-xylene | 14.3 |
| Meta-xylene | 35.5 |
| Ortho-xylene | 17.6 |
| Desorbent: | |
| Toluene | 100 |

The above apparatus utilizes 24 adsorbent chambers having approximately 44 cc. of volume per chamber giving a total bed volume of approximately 1,056 cc. There was approximately 65 cc. of volume in addition to the volume of the actual beds used which made up the internal piping and rotary connecting valve volume giving a grand total of about 1121 cc. of plant volume. The ratio of the connecting piping volume as compared to the entire plant volume was approximately 5.8% which was higher than that present in commercial or pilot plant operations where the aforementioned and commercially pump around circuit is utilized.

The above example exemplifies the operation of the claimed apparatus as used for the separation of components of a feed stream containing a mixture of $C_8$ aromatic isomers. The claimed apparatus is not limited to hydrocarbon separations. It has previously been mentioned it can be utilized in the pharmaceutical or any other type industry where relatively low throughout operations per unit apparatus are utilized and as mentioned before a relatively high ratio of internal connecting volume with respect to the entire plant volume is present which reduces the ability to use commercial type separation apparatus which contains the pump around circuits as have previously been described.

EMBODIMENTS

An embodiment of the present invention includes a fluid solid contacting apparatus comprising a plurality of adsorbent chambers serially connected by connecting conduits in a continuous closed loop configuration and having unidirectional flow directing means in fluid transfer taps located between said chambers, at least two of said fluid transfer taps being connected to external fluid input sources and at least two of said fluid transfer taps being connected to internal fluid reception sources, said fluid transfer taps being connected to the external fluid input sources and the internal fluid outlet reception sources by a flow directing device which advances the external input and internal output sources in the unidirectional cyclic manner along with a series of fluid transfer taps. The apparatus described above can further be characterized in that it comprises a countercurrent fluid-solid contacting apparatus.

We claim as our invention:

1. A fluid-solid contacting apparatus comprising:
   (a) a plurality of adsorbent chambers serially connected by connecting conduits in a continuous closed loop configuration and having unidirectional flow directing check valve means and fluid transfer taps located between said chambers in said connecting conduits, said check valve means providing fluid flow in a single direction through each valve with all of said check valves arranged to cause fluid flow through each in the closed loop in the same direction;
   (b) at least two of said fluid transfer taps being connected to external fluid input sources and at least two of said fluid transfer taps being connected to internal fluid outlet reception sources;
   (c) said fluid transfer taps being connected to the external fluid input sources and the internal fluid outlet reception sources by a flow directing device which advances the external input and internal output sources in a unidirectional cyclic manner along the series of fluid transfer taps in the same direction that said check valves allow fluid flow.

2. The apparatus of claim 1 further characterized in that there is one unidirectional flow directing means located between each adsorbent chamber.

3. The apparatus of claim 2 further characterized in that said unidirectional flow directing means is located on one end of said chambers.

4. The apparatus of claim 1 further characterized in that there is one fluid transfer tap located between each adsorbent chamber on said connecting conduit.

5. The apparatus of claim 1 further characterized in that said flow directing device is a rotary flow directing disc valve.

6. The apparatus of claim 1 further characterized in that said flow directing device is a manifold arrangement containing at least two external fluid input conduits and at least two internal fluid outlet conduits connected to the fluid transfer taps.

7. A process for the selective separation of at least one selected component from a fluid feed stream containing said selected component in admixture with other components which process employs a plurality of adsorbent chambers serially connected by connecting conduits in a continuous closed loop configuration, having unidirectional flow directional check valve means and fluid transfer taps located between said chambers in said connecting conduits to cause flow through said check valve means in a single direction with all said check valve means arranged to cause flow therethrough in the same direction and containing an adsorbent having a preferred selectivity for said selected feed component within said chambers, said process operations comprising:
   (a) passing a feed stream through a fluid transfer tap into at least one of said chambers to effect the selective adsorption of said selected feed component;
   (b) withdrawing at least a portion of a raffinate stream containing said other components from at least one of said chambers through a fluid transfer tap, said feed stream having previously contacted the adsorbent in said chamber;
   (c) passing a desorbent stream capable of desorbing said selected component from said adsorbent through a fluid transfer tap into at least one of said chambers to effect desorption of said selected feed component from said adsorbent, said adsorbent having previously been contacted with said feed stock during a prior period of operations;

(d) withdrawing at least a portion of an extract stream containing said selected feed component from at least one of said chambers through a fluid transfer tap, said selected feed component having been displaced from said adsorbent by the aforesaid desorbent stream;

(e) said feed, extract, desorbent and raffinate streams being advanced in that given order in a unidirectional manner in the same direction that said check valves allow flow along said series of fluid transfer taps by a flow directing device to thereby effect a countercurrent flow of fluid with respect to the adsorbent located within the chambers and the substantially continuous production of extract and raffinate streams.

8. Claim 7 further characterized in that said selected component is adsorbed by said adsorbent in an adsorption zone which is defined as the chambers between the feed inlet and raffinate outlet streams.

9. Claim 7 further characterized in that said selected component is desorbed from said adsorbent by a desorbent stream in a desorbent zone which is defined as the chambers between the desorbent inlet and extract outlet streams.

10. Claim 8 further characterized in that at least a portion of said raffinate stream that passes out of said adsorption zone passes into another chamber.

11. Claim 9 further characterized in that at least a portion of said extract stream that passes out of said desorption zone passes into another chamber.

References Cited

UNITED STATES PATENTS

| 2,751,032 | 6/1956 | Ringo et al. | 55—344 |
| 3,131,232 | 4/1964 | Broughton et al. | 260—674 |
| 2,621,149 | 12/1952 | Scott et al. | 260—674 |
| 3,182,014 | 5/1965 | Seelig et al. | 260—674 |
| 2,967,148 | 1/1961 | Karnofsky | 208—310 |
| 3,201,491 | 8/1965 | Stine et al. | 208—310 |

DELBERT E. GANTZ, Primary Examiner

C. E. SPRESSER, JR., Assistant Examiner

U.S. Cl. X.R.

55—344; 208—310